United States Patent Office 3,703,593
Patented Nov. 21, 1972

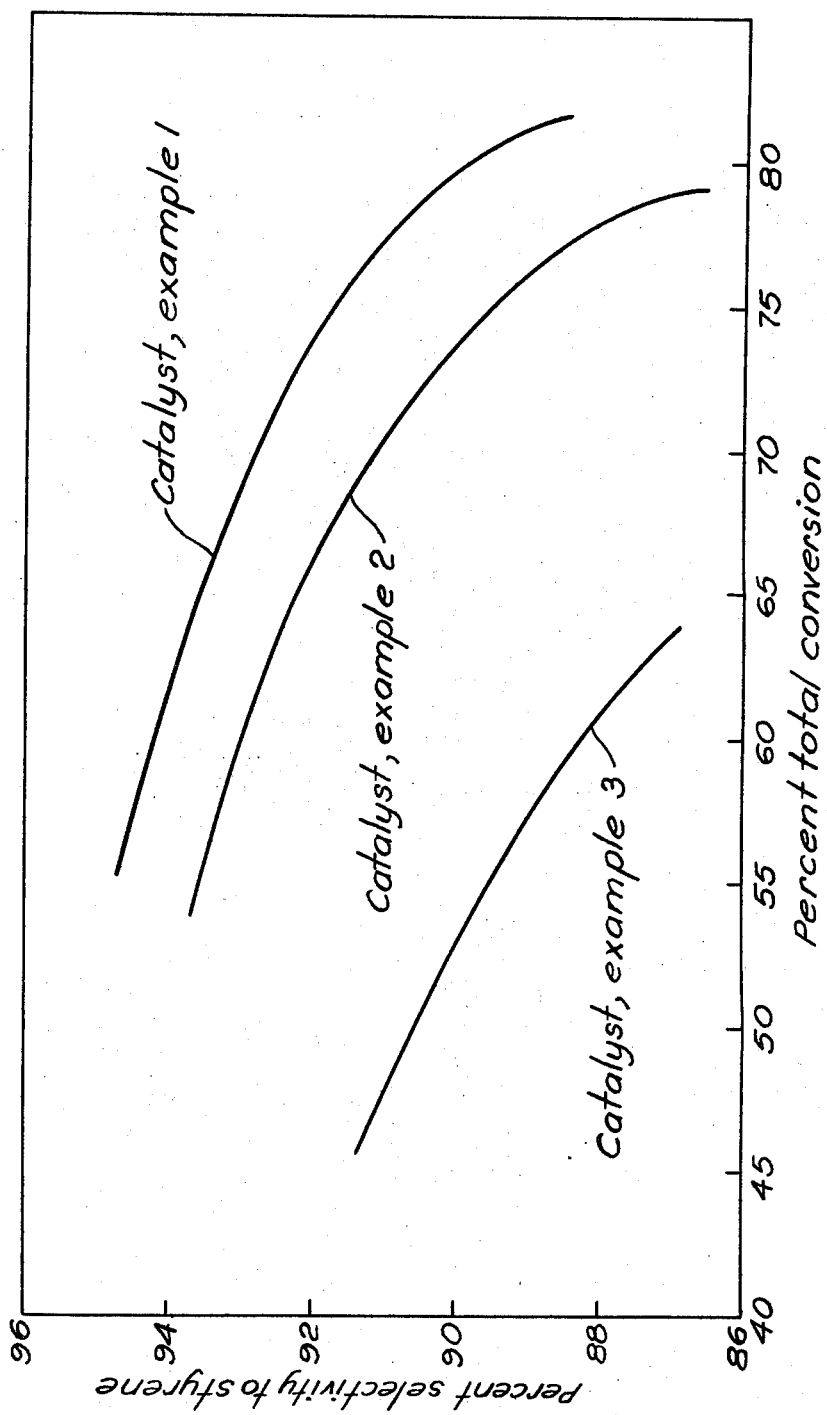

3,703,593
METHOD OF PREPARING AN IMPROVED DEHYDROGENATION CATALYST
Robert R. Turley, Lake Jackson, William M. Castor, Clute, and Kenneth R. Nunnally, Lake Jackson, Tex., assignors to The Dow Chemical Company, Midland, Mich.
Filed July 10, 1970, Ser. No. 53,881
Int. Cl. B01j 11/22
U.S. Cl. 252—470      11 Claims

ABSTRACT OF THE DISCLOSURE

A method for preparing an improved dehydrogenation catalyst comprising iron oxide, an alkali metal oxide, and a chromium compound wherein an improvement is achieved by employing both yellow and red iron oxides in particular proportions with respect to each other in the preparation of the catalyst.

BACKGROUND OF THE INVENTION

Catalytic dehydrogenation of ethylbenzene to styrene is an old and highly successful commercial process. Numerous catalyst compositions have been found useful through the years from just prior to World War II to the present. Most of the catalysts now in commercial use are based on iron oxide as the major component with minor amounts of promoters, e.g. salts or oxides of chromium, manganese, bismuth, tungsten, or molybdenum, chromium being preferred and a compound of potassium, e.g. potassium oxide or carbonate. Such catalysts are known as self-regenerative catalysts and can be used for long periods of time without loss in activity. Relatively recent improvements have seen the incorporation of minor amounts of vanadium (U.S. 3,084,125) and of modifiers (such as carbon black or graphite and methyl cellulose) which affect the pore structure of the catalysts, (U.S. 3,084,125). One recent development shows the use of yellow iron oxide exclusively (U.S. 3,360,579) in place of the red iron oxide normally used in preparing the catalyst. Another characteristic of the better dehydrogenation catalysts is that of low surface area, i.e. less than 10 m.²/g. Low surface area is normally achieved by employing high temperature calcining (>700° C.) and/or by the use of cement as a binder which modifies the pores of the catalytic mass and improves the conversion without sacrificing yield.

The process of dehydrogenation of alkyl aromatic hydrocarbons such as ethylbenzene using these catalysts involves feeding a hydrocarbon stream containing substantial amounts of ethylbenzene or other alkyl aromatic hydrocarbon together with super-heated steam as a source of energy to produce the proper temperature of reaction over the catalyst bed. A molar excess of steam, i.e. 2–20 moles of steam per mole of ethylbenzene is preferred and a reaction temperature of between about 600 and about 800° C. is normally employed. Conversions of 35% to 50% are usually obtained depending upon the catalyst employed and reaction conditions, e.g. ratios of steam to hydrocarbon, composition of the hydrocarbon stream, temperature and pressure. Yields or selectivities to styrene or other vinyl aromatic hydrocarbon in the order of 90% are normally obtained but it has been generally accepted that as the conversion increases the yield or selectivity to the desired vinyl aromatic hydrocarbon decreases.

It would be highly desirable if conversions of 60% or more could be consistently attained with yields or selectivities of 90% or above, but the art has thus far been able to achieve such relatively high conversions only at the expense of reduced yields of substantially below 90%.

SUMMARY

It has now been discovered that by preparing an alkalized iron oxide catalyst which employs particular ratios of yellow iron oxide to red iron oxide as starting materials, a superior catalyst is produced which is capable of achieving higher conversions of the alkyl aromatic hydrocarbon while maintaining a high yield to the desired vinyl aromatic hydrocarbon.

DETAILED DESCRIPTION

In accordance with the process of this invention, the novel catalyst is prepared by employing, as the $Fe_2O_3$ component, a mixture of hydrated (yellow) iron oxide to anhydrous (red) iron oxide within the ranges of from about 1:4 to 17:20 (0.25:1 to 0.85:1) and about 13:7 to 4:1 (1.86:1 to 4:1) weight ratio. Another way of expressing the relative amounts of iron oxides is that the mixture contains an amount within the ranges of from about 20%–46% by weight and from about 65%–80% by weight of yellow iron oxide based on the total oxides present. This mixture of iron oxides is combined with a minor amount of an oxide of an alkali metal, preferably potassium oxide, or an oxide former such as the carbonate, a minor amount of chromium oxide or an alkali metal chromate or dichromate and a suitable binder such as a refractory cement. Alternatively, the catalyst may contain catalytic modifiers such as vanadium oxide or an oxide of manganese, cobalt, copper or zinc. In the preparation of the catalyst of this invention it is preferred to employ, as ingredients in the catalyst paste, from about 5 to about 15 weight percent of methyl cellulose and from about 5 to about 15 weight percent carbon or graphite to provide strength and coherence to the catalyst paste, to improve extrusion or pelletizing characteristics and to provide control of the porosity produced in the catalyst pellets during calcining. The use of such materials in dehydrogenation catalysts is shown in U.S. 2,603,610.

While it is not known what physical effect the use of a specific mixture of yellow iron oxide and red iron oxide to make the catalyst paste has upon the structure of the final catalyst, it is known, as will be demonstrated, that such mixture within the defined proportions will, when employed in combination with the other essential ingredients of a self-regenerating dehydrogenation catalyst, produce an improved catalyst capable of producing higher conversions without any substantial loss of yield.

The terms "yellow iron oxide" and "hydrated $Fe_2O_3$" are used synonymously herein to refer to the form of $Fe_2O_3$ which appears in a variety of colors ranging from light yellow to a deep yellow-orange. Such yellow iron oxides are substantially monohydrates and have a water content of about 13% by weight.

The terms "red iron oxide" and "anhydrous $Fe_2O_3$" are used synonymously herein to refer to the substantially anhydrous $Fe_2O_3$ which is red or red-brown in color.

In accordance with this invention and to achieve the advantages thereof it is necessary to employ a mixture of hydrated $Fe_2O_3$ and anhydrous $Fe_2O_3$ in the wet catalyst mixture in weight proportions of from about 1:4 to about 17:20 (0.25:1 to 0.85:1), preferably from about 7:13 to about 3:4 (0.54:1 to about 0.75:1). In other words, the mixture of iron oxides employed contains from about 20% to 46% of the yellow (or hydrated) iron oxide, and preferably from about 35% to 43%.

There is, as will be apparent from the examples, a second range of proportions which is covered by the process of this invention. The advantages of this invention can be obtained, as indicated earlier, when an amount within the range of 65–80% yellow iron oxide based on the total weight of iron oxides is employed. A preferred range within this alternate range is from about 70 to about 77% by weight of hydrated $Fe_2O_3$ in the oxide mixture. As will be shown, however, this range does not provide the maximum improvement which is obtained by employing an amount within the lower range of proportions, i.e. 20–46%, of the yellow iron oxide. This range does, however, show an improvement over the known art of using either all yellow or all red iron oxide in the preparation of the catalyst. The operable ratio of yellow to red oxide by weight in this range may be expressed as from about 13:7 to 4:1 (1.86:1 to 4:1) while the preferred ratio is from about 7:3 to 10:3 (2.3:1 to 3.3:1). The advantages of this process are most significant at high conversions, i.e. conversions above about 60%.

The two forms of $Fe_2O_3$ first may be mixed together in the proper proportions and such mixture admixed with the other ingredients of the catalyst paste or the two forms of $Fe_2O_3$ may be added separately to the other ingredients and blended to form the final mixture.

While the order of addition of the components of the catalyst paste is not extremely critical and depends to a large extent on the composition of the catalyst being prepared, the general procedure is to dissolve the water-soluble components in water and add thereto the water insoluble components. Sufficient water must be present to form a paste.

The amount of water ordinarily used is within the range of 10% to 50% (exclusive of water of hydration). In order to attain a homogeneous mixture in the shortest possible time an amount of from about 20% to 30% water is used. This amount also makes a paste which is easy to process, i.e. to dry and extrude or pelletize in order to form the catalyst particles. The paste is then either extruded into pellets and dried or dried sufficiently first then pelletized from relatively dry particles. Once formed, the pellets are calcined usually at a temperature of from about 700° C. to about 1000° C. If combustible materials such as carbon, methyl cellulose, sawdust, wood flour and the like, are used, the calcining temperature must be sufficient to volatilize or burn out such combustible materials.

In general, the diameter of the catalyst pellets will range from ⅛ to ¼ inch. Smaller diameter catalyst pellets are normally more active than larger ones but larger diameters have the advantage of producing less pressure drop through the reactor.

The percentages of catalytic components may vary depending on the number or type of components used. The basic components are iron oxide, chromium oxide and an alkali metal oxide such as $K_2O$ and are employed in proportions so as to produce a finished catalyst having percentages as follows: $Fe_2O_3$, 50 to 90 wt. percent; $Cr_2O_3$, 0.5 to 5.0 wt. percent; $K_2O$, 9 to 18 wt. percent. As is well known, the $Cr_2O_3$ may be provided either as $Cr_2O_3$ or as a compound which is heat decomposable to $Cr_2O_3$ such as $K_2Cr_2O_7$. Likewise the alkali metal oxide may be added directly as the oxide or as the carbonate or other compound which is heat decomposable to the oxide.

A preferred catalyst paste composition contains from about 21.8 to about 25.3 wt. percent yellow iron oxide, from about 33.6 to about 37.1 wt. percent red iron oxide, from about 1.6 to about 1.8 wt. percent $Cr_2O_3$, from about 7 to about 10 wt. percent carbon or graphite, from about 7 to about 10 wt. percent methyl cellulose and from about 2.6 to about 3.0 wt. percent cement. It is also frequently desirable to incorporate into said composition from about 2.3 to about 2.7 wt. percent $V_2O_5$.

The proper proportions of yellow to red oxides within the preferred ranges will vary depending upon the relative proportions of total iron oxide to the promoters and modifiers used in formulating the catalyst. These can be determined experimentally by those skilled in the art.

As is known to the art, it is advantageous to include silica, alumina cement or portland cement in the formulations of the catalyst compositions.

The following examples are provided to more fully illustrate the invention and to demonstrate the surprising advantages of using the defined mixture of yellow iron oxide and red iron oxide compared to using either one alone. Such examples are not to be construed, however, as limiting the scope of the invention.

EXAMPLE 1

In accordance with this invention a catalyst paste was prepared by thoroughly mixing the following components in the proportions indicated with sufficient water to produce a paste having a water content (excluding water of hydration) of 26%.

|  | Parts by weight |
|---|---|
| Hydrated $Fe_2O_3$ | 23.6 |
| Anhydrous $Fe_2O_3$ | 35.3 |
| $K_2CO_3$ | 16.7 |
| $K_2Cr_2O_7$ | 2.5 |
| $V_2O_5$ | 2.5 |
| Portland cement | 2.8 |
| Methocel® (a brand of methyl cellulose manufactured by The Dow Chemical Company) | 8.3 |
| Graphite | 8.3 |

The mixture was pelletized, dried and calcined at 700° C. for 2 hours. The calcining step removed the methyl cellulose and graphite from the catalyst pellets leaving a porous structure having a surface area of 2.04 m.²/g. This catalyst was designated as Catalyst 1.

EXAMPLE 2

In order to compare the catalyst of this invention with a known dehydrogenation catalyst, a catalyst was prepared according to U.S. 3,361,683 containing 74.5% anhydrous $Fe_2O_3$, 20.0% $K_2CO_3$ and 2.0% $Cr_2O_3$ and 3.5% $V_2O_5$. This mixture was pelletized, dried and calcined at 700° C. according to the procedure in the above mentioned patent. This catalyst was designated as Catalyst 2.

EXAMPLE 3

In order to compare another known dehydrogenation catalyst to the catalyst of this invention, a catalyst paste was prepared according to U.S. 3,360,579 containing 88.0% hydrated $Fe_2O_3$, 9.5% $K_2O$ and 2.5% $Cr_2O_3$. The mixture was pelleted, dried and calcined at 800° C. This catalyst was designated as Catalyst 3.

EXAMPLE 4

Each of the catalysts 1, 2 and 3 prepared above was placed separately in an electrically heated 1″ diameter stainless steel pipe containing 70 ml. catalyst. Preheated steam and ethyl benzene were fed over the catalyst bed at temperatures of between 600 and 660° C. at a steam to ethylbenzene ratio of 2:1 by weight, a back pressure of 5 p.s.i.g. and a liquid hourly space velocity of 1.0 ml. EB/ml. cat./hour. The temperature for a given run was controlled within the designated range to give the desired conversion. Temperatures above this range would have resulted in thermal cracking in addition to catalytic cracking and the results would not have been comparable.

The results obtained at various conversions are shown in Table I below:

TABLE I

| Catalyst No. | Wt. percent conversion of ethyl benzene | Selectivity to styrene (yield) wt. percent |
|---|---|---|
| 1 | 40 | 95.5 |
| 2 | 40 | 94.8 |
| 3 | 40 | 92.0 |
| 1 | 60 | 94.3 |
| 2 | 60 | 93.0 |
| 3 | 60 | 88.2 |
| 1 | 80 | 90.0 |
| 2 | 80 | 86.0 |
| 3 | 80 | 80.5 |

These data are plotted in the figure which shows graphically the unexpected improvement achieved by the use of a mixture, in the required proportions, of yellow $Fe_2O_3$ and red $Fe_2O_3$.

EXAMPLE 5

In a series of experiments identical catalysts were prepared, except for the proportions of yellow and red oxides used. These catalysts were then employed to produce styrene and conversion-selectivity values (CSV)* were obtained for each catalyst. The formulations of catalyst paste each contained 70.7% $Fe_2O_3$, 20.0% $K_2CO_3$, 3.0% $K_2Cr_2O_7$, 3.0% $V_2O_5$ and 3.3% portland cement. In the preparation of the catalyst the paste contained 10% by weight each of flake graphite and methyl cellulose, but these were burned off during the calcining step.

Table II below shows the percentage of hydrated oxide in the original catalyst preparation and the CSV* values obtained when using the catalyst to prepare styrene. The conditions of the process were constant in testing all of the different catalysts. Thus, the weight ratio of steam to ethyl benzene (EB) was 2:1, the liquid hourly space velocity was 1.0 ml. EB/ml. cat./hour. The temperature was 600–660° C. and a back pressure was 5 p.s.i.g.

The process was conducted within the designated temperature range over the various catalysts so that a selectivity of 90% to styrene was obtained. The percent conversion at this selectivity was then obtained and the two numbers added to obtain the CSV value.

TABLE II

| Hydrated $Fe_2O_3$ as percent of total iron oxide: | CSV value |
|---|---|
| 0 | 164.5 |
| 20 | 165.0 |
| 25 | 165.5 |
| 30 | 166.0 |
| 35 | 166.7 |
| 40 | 167.5 |
| 60 | 164.3 |
| 70 | 165.3 |
| 75 | 166.0 |
| 100 | 163.7 |

*CSV—This is a numerical value obtained by adding the conversion and selectivity (yield to styrene) for a given run.

We claim:

1. In a process for preparing a catalyst for the dehydrogenation of alkyl aromatic hydrocarbons to vinyl aromatic hydrocarbons by preparing a paste containing $Fe_2O_3$, $Cr_2O_3$ or an alkali metal chromate or dichromate decomposable to $Cr_2O_3$, an alkali metal oxide or an alkali metal salt decomposable to an alkali metal oxide, and sufficient water to form said paste, forming said paste into pellets and calcining said pellets into a finished catalyst, the improvement which comprises employing as the $Fe_2O_3$ component a mixture of hydrated $Fe_2O_3$ and anhydrous $Fe_2O_3$ in a weight proportion of between about 1.86:1 and about 4:1.

2. The process of claim 1 wherein the proportion of hydrated $Fe_2O_3$ to anhydrous $Fe_2O_3$ is within the range of from about 2.3:1 to about 3.3:1.

3. The process of claim 1 wherein the catalyst paste contains carbon or graphite and methocel as pore controlling agents.

4. The process of claim 3 wherein the catalyst pellets are calcined at a temperature sufficient to burn out the carbon or graphite and methocel.

5. In a process for preparing a catalyst for the dehydrogenation of alkyl aromatic hydrocarbons to vinyl aromatic hydrocarbons wherein from about 50–90% $Fe_2O_3$ is admixed with from about 0.5 to 5.0% $Cr_2O_3$ or an alkali metal chromate or dichromate salt decomposable to $Cr_2O_3$ and from about 9–18% of an alkali metal oxide or an alkali metal salt decomposable to an alkali metal oxide, forming such mixture into pellets and calcining such pellets into a finished catalyst, the improvement which comprises admixing, as the $Fe_2O_3$ component a mixture of hydrated $Fe_2O_3$ and anhydrous $Fe_2O_3$ in a weight proportion of between about 1.86:1 and about 4:1.

6. The process of claim 5 wherein 70–80% $Fe_2O_3$ is admixed with 2–3% $Cr_2O_3$ and 12–15% of an alkali metal oxide.

7. In a process for preparing a catalyst for the dehydrogenation of alkyl aromatic hydrocarbons to vinyl aromatic hydrocarbons by preparing a paste containing $Fe_2O_3$, $Cr_2O_3$ or an alkali metal chromate or dichromate decomposable to $Cr_2O_3$, an alkali metal oxide or an alkali metal salt decomposable to an alkali metal oxide, and sufficient water to form said paste, forming said paste into pellets and calcining said pellets into a finished catalyst, the improvement which comprises employing as the $Fe_2O_3$ component a mixture of hydrated $Fe_2O_3$ and anhydrous $Fe_2O_3$ in a weight proportion of between about 0.25:1 and about 0.85:1 or between about 1.86:1 and about 4:1 and wherein $V_2O_5$ is employed as a modifier.

8. The process of claim 7 wherein the proportion of hydrated $Fe_2O_3$ to anhydrous $Fe_2O_3$ is within the ranges of from about 0.54:1 to about 0.75:1 or from about 2.3:1 to about 3.3:1.

9. The process of claim 7 wherein the catalyst paste contains 50–90% $Fe_2O_3$, 0.5 to 5.0% $Cr_2O_3$ and 9–18% of an alkali metal oxide.

10. The process of claim 7 wherein the catalyst paste contains carbon or graphite and methyl cellulose as pore controlling agents.

11. The process of claim 7 wherein the catalyst pellets are calcined at a temperature sufficient to burn out the carbon or graphite and methyl cellulose.

References Cited

UNITED STATES PATENTS

| 2,408,140 | 9/1946 | Gutzeit | 252—470 X |
| 2,603,610 | 7/1952 | Amos et al. | 252—470 |
| 2,683,123 | 7/1954 | Schwegler et al. | 252—470 |
| 2,866,790 | 12/1958 | Pitzer | 252—470 X |
| 3,360,579 | 12/1967 | Hills et al. | 252—470 X |

DANIEL E. WYMAN, Primary Examiner

W. J. SHINE, Assistant Examiner

U.S. Cl. X.R.

260—669 R